United States Patent
Gao et al.

(10) Patent No.: US 7,397,805 B2
(45) Date of Patent: Jul. 8, 2008

(54) SYSTEMS AND METHODS FOR GOODPUT GUARANTEE THROUGH ADAPTIVE FAIR QUEUING

(75) Inventors: Xia Gao, San Jose, CA (US); Moo Ryong Jeong, San Jose, CA (US); Fujio Watanabe, Sunnyvale, CA (US); Gang Wu, Cupertino, CA (US)

(73) Assignee: NTT DoCoMo Inc., Tokyo (JP)

( * ) Notice: Subject to any disclaimer, the term of this patent is extended or adjusted under 35 U.S.C. 154(b) by 991 days.

(21) Appl. No.: 10/405,186

(22) Filed: Apr. 2, 2003

(65) Prior Publication Data

US 2004/0196860 A1    Oct. 7, 2004

(51) Int. Cl.
    *H04J 3/16* (2006.01)
(52) U.S. Cl. ............... 370/395.41; 370/395.65; 370/437; 370/335; 370/338; 370/341; 370/408; 370/329; 370/342
(58) Field of Classification Search ......... 370/395.65, 370/437, 395.41, 335, 341, 342, 408, 339, 370/329, 338
See application file for complete search history.

(56) References Cited

U.S. PATENT DOCUMENTS

| | | | |
|---|---|---|---|
| 5,712,851 A * | 1/1998 | Nguyen et al. | 370/399 |
| 6,128,278 A * | 10/2000 | Joffe et al. | 370/229 |
| 6,148,001 A * | 11/2000 | Soirinsuo et al. | 370/395.4 |
| 6,658,009 B1 * | 12/2003 | Yamashita et al. | 370/395.65 |
| 6,801,776 B2 * | 10/2004 | Notanii et al. | 455/451 |
| 6,868,065 B1 * | 3/2005 | Kloth et al. | 370/236 |
| 6,999,432 B2 * | 2/2006 | Zhang et al. | 370/328 |
| 7,061,861 B1 * | 6/2006 | Mekkittikul et al. | 370/230 |
| 7,239,607 B1 * | 7/2007 | Vijeh et al. | 370/230 |
| 2002/0089952 A1 * | 7/2002 | Cao et al. | 370/335 |
| 2002/0178263 A1 * | 11/2002 | Hreha et al. | 709/226 |
| 2003/0051466 A1 * | 3/2003 | Baeuerle et al. | 60/285 |
| 2003/0054843 A1 * | 3/2003 | Notani et al. | 455/466 |

(Continued)

OTHER PUBLICATIONS

R.F. Liao, A. T. Campbell, "A Utility-Based Approach for Quantitative Adaptation in Wireless Packet Networks" in Wireless Networks, 7,541-557, 2001, Kluwer Academic Publishers, Manufactured in The Netherlands.*

(Continued)

*Primary Examiner*—Edan Orgad
*Assistant Examiner*—Wutchung Chu
(74) *Attorney, Agent, or Firm*—Edward C. Kwok; MacPherson Kwok Chen & Heid LLP

(57) ABSTRACT

Disclosed herein are systems and methods for communicating a number of data flows on a single communications channel. In one embodiment, a method of communicating a number of data flows on a shared communications channel includes the acts of (1) calculating a set of optimum goodput rates for the data flows, in order to maximize a total utility of the data flows, (2) calculating a set of optimum throughput rates for the data flows based on the optimum goodput rates, and (3) transmitting the data flows on the shared communications channel with the optimized throughput rates. Optimization is preferably done using utility functions that indicate the utility of the data flows as a function of their goodput rates. The method can additionally block temporarily a transport layer of at least one of the data flows if the transport layer of that data flow is bottlenecked.

27 Claims, 5 Drawing Sheets

U.S. PATENT DOCUMENTS

2003/0063562 A1* 4/2003 Sarkinen et al. ............. 370/230
2003/0161266 A1* 8/2003 Baccelli et al. ............. 370/229
2004/0160984 A1* 8/2004 Sidhushayana et al. ..... 370/474

OTHER PUBLICATIONS

K. Park and W. Wang, "AFEC: an Adaptive Forward Error Correction Protocol for End-to-end Transport of Real- time Traffic" in International Conference on Computer Communications and Networks, 1998.*

J. Korhonen and Y. Wang, "Effect of Packet Size on Loss Rate and Delay in Wireless Links"IEEE communications Society 2005.*

A. AlWehaibi, M. Kadoch, and A. ElHakeem, "Packet Loss Probability for DiffServ over Heterogeneous MPLS Multicast Networks: A Simulation Study" IEEE CCECE2004-CCGE12004.*

Lee Breslau and Scott Shenker, "Best-Effort versus Reservations: A Simple Comparative Analysis," *ACM SIGCOMM '98* Vancouver B.C., pp. 3-16, 1998.

David A. Eckhardt and Peter Steenkiste, "Effort-limited Fair (ELF) Scheduling for Wireless Networks," *IEEE INFOMCOM 2000*, pp. 1-10, 2000.

Sally Floyd, Mark Handley, Jitendra Padhye, Jörg Widmer, "Equation-Based Congestion Control for Unicast Applications," *SIGCOMM '00*, pp. 45-58, Aug. 2000.

Xia Gao, Thyagarajan Nandagopal, and Vaduvur Bharghavan, "On Improving the Performance of Utility-based Wireless Fair Scheduling Through a Combination of Adaptive FEC and ARQ," *Journal of High Speed Network*, pp. 1-20, 2001.

F.P. Kelly, A.K. Maulloo, and D.K.H. Tan, "Rate control for communication networks: shadow prices, proportional fairness and stability," *Journal of the Operational Research Society*, pp. 1-20, Mar. 1998.

Raymond R.-F. Liao and Andrew T. Campbell, "A Utility-Based Approach for Quantitative Adaptation in Wireless Packets Networks," *Wireless Networks 7*, pp. 541-557, 2001.

Songwu Lu, Vaduvur Bharghavan, and Rayadurgam Srikant, "Fair Scheduling in Wireless Packet Networks," *ACM SIGCOMM*, Sep. 1997.

L. Massoulié and J. Roberts, "Bandwidth sharing: objectives and algorithms," *IEEE INFOCOM*, 1999.

T.S. Eugene Ng, Ion Stoica, and Hui Zhang, "Packet Fair Queueing Algorithms for Wireless Networks with Location-Dependent Errors," *IEEE INFOCOM*, Mar. 1998.

Jitendra Padhye, Victor Firoiu, Don Towsley, and Jim Kurose, "Modeling TCP Throughput: A Simple Model and its Empirical Validation," *ACM SIGCOMM '98*, 1998.

Reza Rejaie, Mark Handley, and Deborah Estrin, "RAP: An End-to-end Rate-based Congestion Control Mechanism for Realtime Streams in the Internet," *IEEE INFOCOM '99*, 1999.

Lakshminarayanan Subramanian, Ion Stoica, Hari Balakrishnan, and Randy H. Katz, "OverQoS: Offering Internet QoS Using Overlays," *First Workshop on Hot Topics in Networks (HotNets-I)*, Oct. 2002.

* cited by examiner

910 — Calculate $\alpha_i = (1+\alpha_{appl,i})(1+\alpha_{tran,i})(1+\alpha_{link,i})$, representing the system FEC and ARQ overhead ratio.

912 — Calculate $\beta = \min\{\beta_{appl}, \beta_{tran}, \beta_{link}\}$ representing the fraction of lost goodput in the system.

914 — Calculate the multi-layer overhead ratio:
$$\mu_i = r_{tran,i} \times \frac{1+\alpha_i}{1-\beta}$$

916 — Calculate the multi-layer overhead function:
$$F_i(r_i) = r_i \times \mu_i$$

FIG. 9

1010 — Determine the maximum $K$
($K$ := the weighted marginal utility common to all flows)
in light of the constraint of channel capacity $C$:
$$\sum_i F_i\left((U_i')^{-1}(K/w_i)\right) \leq C$$

1020 — The optimized goodput rate for flow $i$ is:
$$r_i = (U_i')^{-1}(K/w_i)$$

FIG. 10

SYSTEMS AND METHODS FOR GOODPUT GUARANTEE THROUGH ADAPTIVE FAIR QUEUING

BACKGROUND OF THE INVENTION

The invention relates generally to wireless communications and more specifically to techniques for allocating channel capacity among several user applications.

The increasing number of wireless data users and the deployment of broadband wireless network have brought the issue of fair channel access to the forefront. The channel capacity of a communications channel indicates the maximum data rate that can be transmitted through the channel. The channel capacity is colloquially referred to as the channel's "bandwidth." Fairness among users generally implies that the channel capacity has been successfully allocated among the users' data flows in proportion to the "weights" of the users. In wireline networks, fluid fair queuing has long been a popular paradigm for achieving instantaneous fairness with bounds on the maximum delays in channel access. However, adapting wireline fair queuing to the wireless domain is complicated by domain-specific issues such as location-dependent transmission errors and errors from bursty channels. Consequently, several wireless fair queuing schemes have been proposed for adapting fair queuing to the wireless domain, but many problems still exist.

Previous research adapting wireline fair queuing to the wireless domain has generally produced techniques that approximate fair queuing when the channel is clean. When the channel needs to ration access to the mobile users, and one mobile user's data flow is being affected by bursty transmission errors, these techniques defer sending packets for the affected mobile user's data flow during the error bursts. During this time, the affected flow's time slots are instead used to transmit the packets of the clean flows. For the flow affected by channel errors, the transmission is resumed only when its link quality improves to an acceptable level. In order to achieve certain fairness among flows, some of the techniques also supplement the mobile user with additional bandwidth to compensate for the time period when it was skipped. In this way the flow that was denied service because of the channel error is expected to eventually receive its fair share of services, once its channel becomes clean.

Previous techniques, however, do not take advantage of a variety of sources of useful information for sharing limited channel resources among a number of users.

BRIEF SUMMARY

Described herein are systems and methods for communicating a number of data flows on a single communications channel. In one embodiment, a method of communicating a number of data flows on a shared communications channel includes the acts of (1) calculating a set of optimum goodput rates for the data flows, in order to maximize a total utility of the data flows, (2) calculating a set of optimum throughput rates for the data flows based on the optimum goodput rates, and (3) transmitting the data flows on the shared communications channel with the optimized throughput rates. Additionally, the optimum goodput rates can be preferably found in response to utility functions for the various data flows, where the utility functions indicate the utility of the data flows, preferably as a function of their goodput rates.

In a preferred embodiment, the method calculates the set of optimum throughput rates using (1) the relationship between throughput rates and goodput rates and (2) the optimum goodput rates. The relationship between throughput rates and goodput rates is preferably estimated by examining real-time operating conditions.

In one implementation, the method additionally involves monitoring a transport layer of at least one of the data flows and, if the transport layer of that data flow is bottlenecked, temporarily blocking that data flow or temporarily assigning a low throughput rate to that data flow.

BRIEF DESCRIPTION OF SEVERAL VIEWS OF THE DRAWINGS

Other objects and advantages of the invention will become apparent upon reading the following detailed description and upon reference to the accompanying drawings.

FIG. 9 is a flowchart of one preferred implementation of a procedure for modeling the relationship between throughput and goodput for a data flow.

FIG. 10 is a flowchart of one preferred implementation of a procedure for finding the optimal goodput transmission rates.

DETAILED DESCRIPTION OF THE INVENTION

1. Introduction

Figure 1:
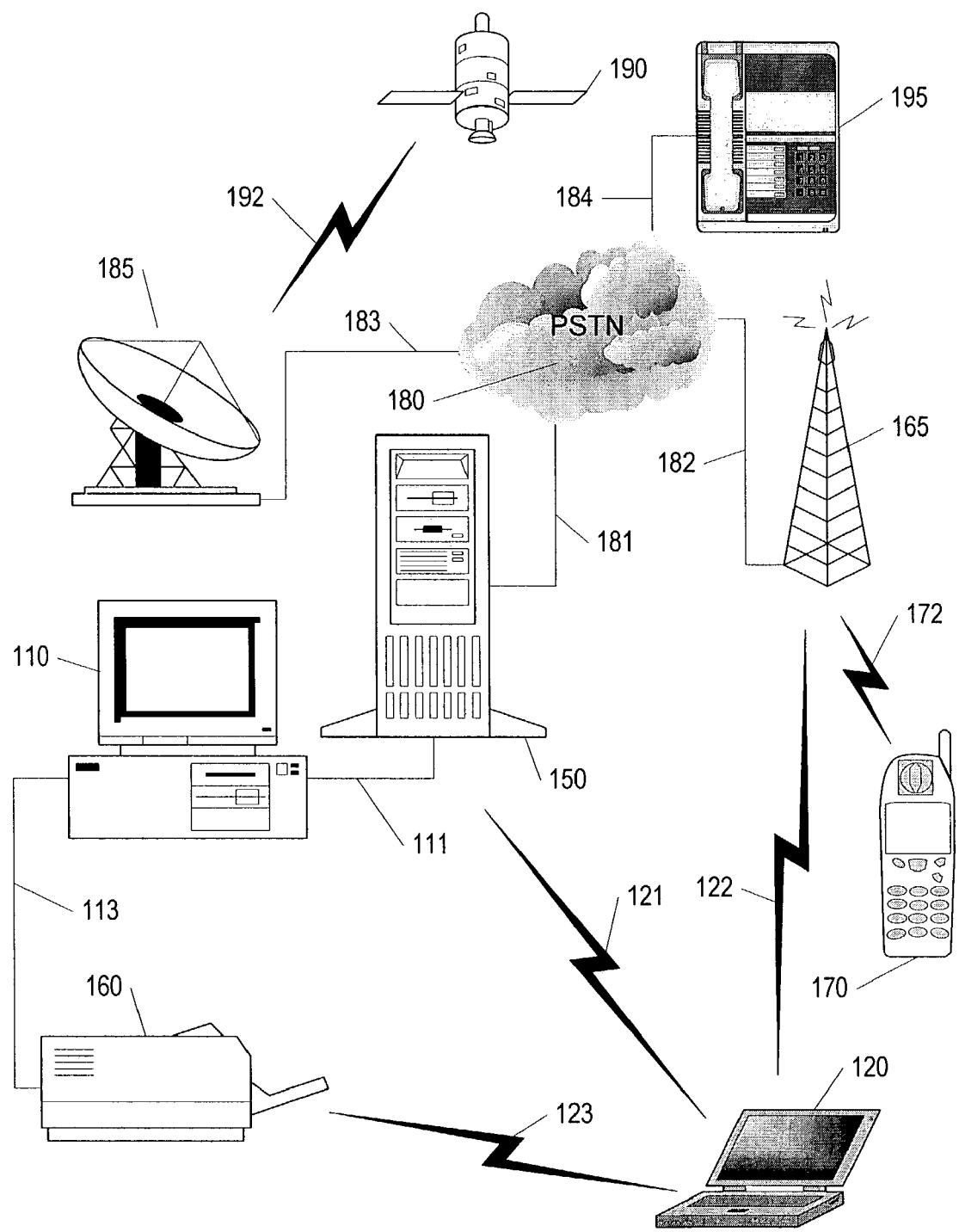
FIG. 1 illustrates a variety of communication links for parallel data flows.

FIG. 1 illustrates a variety of communications links that can benefit from the network communications techniques described herein. Among others, the links can connect a central computer 150, a client computer 110, a portable computer 120, peripherals such as a printer 160, a wireless tower 165, a mobile telephone 170, a telephone network 180, a satellite dish 185, a communications satellite 190, and a wire line telephone 195. While these devices span a broad range of complexity and cost, the techniques herein described can be adapted to improve their usage of the data channels over which they communicate.

Those data channels include, for example, wired links such as a local area network (LAN) 111, a peripheral connection 113, a digital subscriber line (DSL) 181, a base station link 182, a satellite dish link 183, and a digital telephone link 184, among others. The data channels also include wireless links such as a wireless link 121 (such as an IEEE 802.11 (a), (b), or (g) link), a cellular data link 122 (such as a 2.5 G or 3 G link), a wireless peripheral link 123 (such as a Bluetooth link), a cellular digital voice link 172, and a satellite microwave link 192, among others.

In the examples shown in FIG. 1, client computer 110 communicates with central computer 150 through LAN 111, and with printer 160 through peripheral connection 113. Telephone network 180 communicates with central computer 150 through DSL line 181, with wireless tower 165 through base station link 182, with satellite dish 185 through satellite dish link 183, and with wire line telephone 195 through digital telephone link 184. Portable computer 120 communicates with central computer 150 through wireless link 121, with printer 160 through wireless peripheral link 123, and with wireless tower 165 through cellular data link 122. Wireless tower 165 communicates with mobile telephone 170 through cellular digital voice link 172. Satellite dish 185 and communications satellite 190 communicate through satellite microwave link 192.

In each of the communications links represented in FIG. 1, the transmitted data can generally include a number of separate data flows. For example, wireless link 121 can be used to transmit a variety of information streams in parallel between portable computer 120 and central computer 150. The various data flows can be, for example, information sent by a file transfer application, information sent to a browser application, information sent by system software, and others. All these data flows need to efficiently share the common resource of the communications link (wireless link 121) that connects the two communication devices (portable computer 120 and central computer 150).

To determine a scheme for efficiently allocating a communications link among various data flows, the techniques described herein preferably look to the rate of goodput transmission, rather than the rate of throughput transmission, for each of the various data flows sharing a communications link. Information transmitted in a data flow includes payload data that are the intended objects of the communications. Generally speaking, the goodput of a data flow is this payload information. The transmission, however, also includes other information in addition to the payload. The additional information includes redundancy bits, retransmissions, packet headers, and other information that is important to the various layers of the communications system, but that is not directly important to the applications that have requested the communications. Generally speaking, this information plus the goodput is the throughput of the data flow. For particular situations, "goodput" and "throughput" can be more precisely defined, based on the types of protocols used in the various layers of the communications system.

Figure 2:
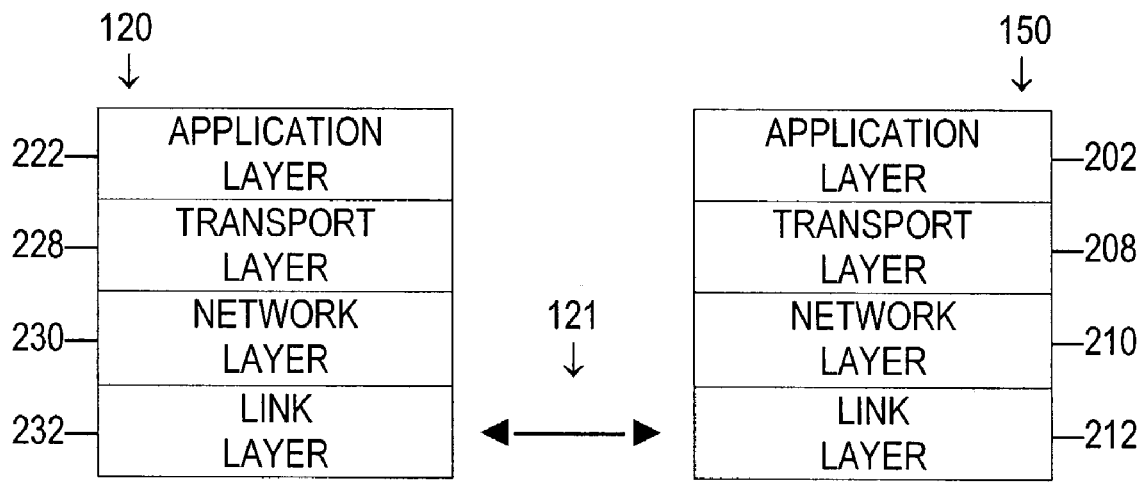
FIG. 2 illustrates some of the conceptual network layers in the communications path between applications running on two devices.

FIG. 2 illustrates some of the conceptual network layers in the communications path between applications running on two devices, such as portable computer 120 and central computer 150 connected by wireless link 121. Portable computer 120 and central computer 150 each have a series of programs that implement communications in layers. Shown in the FIG. 2 for portable computer 120 are an application layer 222, a transport layer 228, a network layer 230, and a link layer 232 (also known as a data layer). Similarly, central computer 150 also has an application layer 202, a transport layer 208, a network layer 210, and a link layer 212. Not all of these layers are necessarily implemented in all communications units. Additional layers, not shown, can also be used, such as a session layer, a presentation layer, or protocols for a physical layer. Also not shown are intermediate units that may be used in wireless link 121. For example, wireless link 121 can include a wireless access point (WAP) connected by cable to central computer 150, and a wireless network card connected by socket to portable computer 120. An RF connection between the central computer's WAP and the portable computer's network card completes the link 121.

A transmitting application, such as an FTP server, running on portable computer 120 sends data through application layer 222 to transport layer 228, which sends the data in turn to network layer 230, which then sends the data to link layer 232. Each layer can parse and encapsulate the transmitted data according to a variety of protocols. Each layer also cooperates with the previous and subsequent layer to smoothly control the timing of the data transfers.

Link layer 232 in portable computer 120 transmits the data over wireless link 121 to link layer 212 in central computer 150. The data received by link layer 212 are passed up the layers in central computer 150. The received data are sent sequentially from link layer 212 through network layer 210 and transport layer 208 to application layer 202, which makes them available to a receiving application, such as an FTP client on central computer 150.

Figure 3:
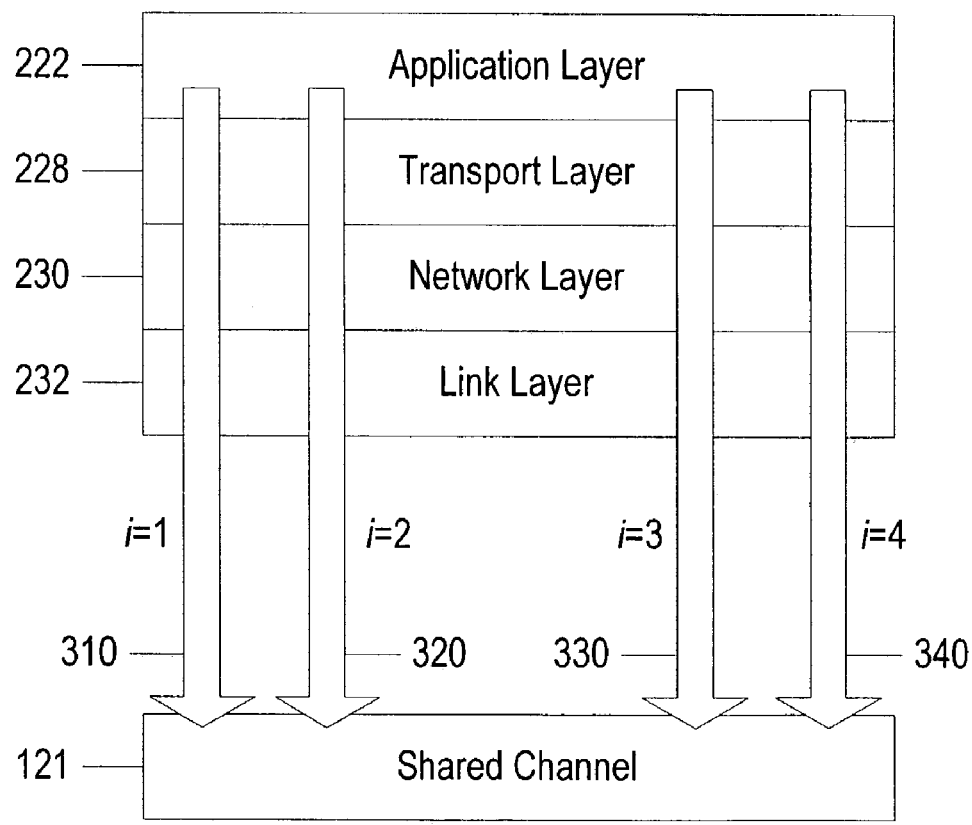
FIG. 3 illustrates the transmission of several parallel data flows through the network layers between two applications communicating over a communications channel.

FIG. 3 illustrates the transmission of several data flows through the communications layers of portable computer 120. Shown by way of example are four data flows 310, 320, 330, and 340, identified by index numbers i that range from 1 to 4. Each data flow is a stream of transmitted data from an application on portable computer 120 and is being sent through the shared link 121, intended for a particular application on another communications device. In the illustrated situation, flow 310 (i=1) is data from an FTP server and is being sent to an FTP client on central computer 150; flow 320 (i=2) is data from the FTP server being sent via central computer 150 to another FTP client on client computer 110; flow 330 (i=3) is data being sent from a web server program via central computer 150 to a web browser on client computer 110; and flow 340 (i=4) is data from the web server program being sent via central computer 150, via telephone network 180, via satellite dish 185, and via satellite 190 to a remote user linked to satellite 190.

All four of these data flows share wireless link 121. Ultimately, link layer 232 is the arbiter that allocates the channel resources of wireless link 121 among the data flows 310, 320, 330, and 340. In one implementation of wireless link 121, the separate flows use interleaved time slots that are assigned to them by link layer 232. On an instantaneous basis, then, the data flows 310, 320, 330, and 340 in this implementation are not simultaneous flows in a strict sense. In this implementation, at any given instant the entire channel capacity of link 121 is assigned to a single data flow. However, in the sense that the data flows still share a common resource, they can be considered "parallel" or "simultaneous" flows even in this implementation.

Tools that allow the parallel data flows to most efficiently use the shared channel improve the performance of the, shared channel (wireless link 121) and the overall speed with which the data flows are transmitted. However, it is necessary to ensure that the shared channel is not completely allocated to just one of the flows for too long of a period. This would mean that one or more of the other data flows has to suffer "unfairly" through an overly long wait or an overly slow transmission. Some deliberate measures for fairly allocating the channel resources among the data flows are needed to ensure that the data flows each transmit their information smoothly.

Much previous work in allocating the resources of a shared channel has only provided fairness at the link layer "slot" level rather than the fairness at the application level. That is, the allocations have been made with a view of fairness in throughput, not fairness in goodput. Fairness at the application level can be substantially improved by measuring transmitted goodput (valid useful data—only the payload, or data useful for the application) instead of measuring only transmitted throughput (all the data sent out on behalf of an application, including useful data, redundancy bits, and retransmissions). One of the various advantages of the techniques disclosed herein is that they can be used to guarantee the receiving rate of useful application layer data, which is directly related to the application performance perceived by a user.

In designing a system that allocates channel resources based on goodput rather than throughput, it is helpful to examine the underlying causes of the overhead that make throughput data bulkier than goodput data. Two of the main reasons for the difference between an application's throughput and its goodput are wireless channel corruption and end-to-end congestion loss. Facing these two challenges, different layers of a communications system use different techniques to combat the packet loss. Three of the main three techniques are forward error correction (FEC), automatic repeat request (ARQ), and mechanisms for congestion control and reliable transmission.

FEC is used in different layers, such as the application layer (source coding), network layer (overlay network) or link layer (channel coding) to protect information from packet loss by adding some redundant bits to the transmitted packets. FEC can deal both with channel corruption errors and with packet loss errors. When FEC is coded by the information in each individual packet, it is used to tolerate some number of bit corruptions from channel interference. When FEC is coded across multiple packets or multiple flows, it can be used to recover from both channel corruption error and congestion loss path error. In either case, there is a tradeoff between error recovery ability and bandwidth overhead. In general, more FEC bits mean more protection ability and less corruption loss. But more FEC bits also increase the bandwidth overhead because of the redundancy bits. This increase can be an undue expense when the channel error or congestion loss is not high.

A majority of the previous techniques for adapting fluid fair queuing to the wireless cellular domain are purely ARQ based. In an ARQ scheme, a packet is retransmitted until either a positive acknowledgement is received, or a maximum retransmit threshold is reached. ARQ has features such as robustness, simplicity, and small overhead, but it can cause large delays and unpredictable variation in delays if the probability of packet loss is high. Some of the existing schemes compensate the flows experiencing corruption with an increased share of channel resources. Some existing schemes also require multiple ARQs to transmit a packet by adjusting weights according to the success rate of the transmission.

Besides FEC and ARQ techniques, techniques for congestion control and rate adaptation have been used in the transport layer to increase the transmission rate variation seen by application layer. Because neither FEC nor ARQ can completely protect packets against channel corruption loss, the packet loss seen by the transport layer still includes both congestion loss and corruption loss. Some of the applications use the User Datagram Protocol (UDP) as the transport so that the influence of the packet loss is mainly compensated by the ARQ or FEC. But there is still much traffic using elastic transport protocol such as the Transfer Control Protocol (TCP) or Rate Adaptation Protocol (RAP), which adapts the transmission rate based on the observed packet loss. Such elastic mechanisms for decreasing the sending rate in face of congestion are necessary and valuable because they decrease the congestion ratio and make networks stable. These elastic mechanisms, however, work at the cost of reducing the average sending rate, i.e., the application layer data sending rate.

Thus, one of the existing solutions' common problems for the guarantee of application goodput is that fairness at the application layer is not well defined. As discussed above, much of the prior efforts have focused on improving link-layer fairness. There has been little work on the application layer fairness. More specifically, the reason of the difference between application layer and link layer have not been not well understood.

A second common problem for application goodput is that no generic methods exist to guarantee the application layer goodput. Different schemes have been designed to take into account the overhead of techniques for combating wireless channel error, such as FEC and ARQ. But none of these schemes use the interaction of FEC, ARQ, and transport layer rate adaptation techniques to propose a generic framework guaranteeing goodput rates for the application layer.

Previous adaptive weight schemes have typically ignored rate variation effects introduced by transport layer rate adaptation. While the previous schemes have addressed the effects of FEC and ARQ, significant improvements can be made to the design of adaptive weight schemes by also considering rate adaptation in the transport layer. While some previous work has noticed the difference between application layer throughput and goodput, it has not clearly defined fairness in terms of the goodput of application layer.

Furthermore, the design of communication protocols can also benefit from identifying the main reasons that cause the differences between throughput and goodput for the application layer. It is then possible to propose a fair queuing scheme with an adaptive link layer. The adaptive link layer can dynamically adjust weights of each flow to take these differences into account.

2. Transmission Method Overview

Figure 4:
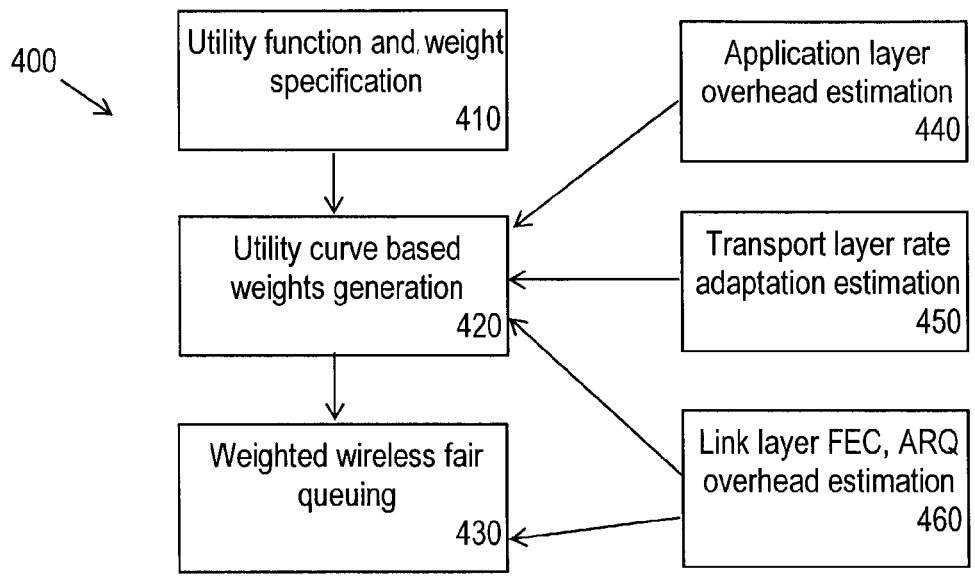
FIG. 4 is a high-level block diagram of one embodiment of a data transmission system that allocates resources on a shared channel.

FIG. 4 is a high-level block of one embodiment of a data transmission system 400 that allocates resources on a shared channel, such as wireless link 121, in terms of the goodput rates for several data flows. In this embodiment, the system has six interacting modules: a utility function and weight-specification module 410, a utility-curve based weights generation module 420, a weighted fair queuing module 430, an application-layer overhead estimation module 440, a transport-layer rate adaptation estimation module 450, and a link layer FEC and/or ARQ overhead estimation module 460. Three of the modules evaluate factors that contribute to overhead and other factors that make the throughput rate different from goodput rate for a data flow. Modules 440, 450, and 460 analyze each of the data flows being transmitted on the shared channel for the appropriate factors.

A fourth module, the utility function and weight-specification module 410, characterizes the value of the various data flows. Module 410 specifies the relative weights to be accorded to each of the data flows. Module 410 also specifies information about the utility of increased transmission speed for the data flows; that is, it quantifies the value of increasing the transmission rate for each of the data flows. As discussed below, this module 410 usefully recognizes that an increased data rate benefits some flows more than others.

In a preferred implementation, data transmission system 400 includes two modules that use information collected by the other four modules to efficiently allocate the resources of the shared channel among the various data flows. These two modules include utility-curve based weights generation module 420 and weighted fair queuing module 430. Module 420 preferably receives the information generated by modules

440, 450, and 460, and module 430 preferably receives the information generated by modules 460 and 420.

The utility function and weight specification module 410 enables the higher layer (typically, based on application or user-level service level agreement) to specify the utility function and weight for each application flow. These two parameters jointly capture the price that the application is willing to pay for effective service—a "goodput" rate of overhead-free useful data. Thus, the weight utility of a flow i is specified as $w_i U_i(r_i)$, where the quantity $w_i$ and the function $U_i(r_i)$ are provided by the higher layer. In this notation, $w_i$ is the assigned weight of flow number i, the variable $r_i$ is the transmission rate of the goodput information in flow number i, and $U_i(r_i)$ is the utility function for flow number i.

As further explained below, the utility function $U_i(r_i)$ borrows from concepts of economics to quantify the value of increasing the goodput data rate for each flow i. At the high level, the goal is to optimize the aggregate weighted utility of the system subject to channel and capacity constraints.

One preferred feature of the system is that the overhead estimation modules include three separate but interacting modules for assessing the added overhead in each layer. The application layer overhead estimation module 440 takes into account the difference between goodput and throughput in the application layer. Because a particular application may not in itself include such functionality, this module 440 can preferably reside in the middleware and provide standard service to each application running on top of it. The transport layer rate adaptation estimation module 450 reports the packet loss rate seen at the transport layer. If UDP is used as the transport protocol, only the loss percentage needs to be considered. On the other hand, if elastic protocols such as TCP or RAP are used, the rate adaptation due to the packet loss also needs to be considered. When the application layer uses advanced FEC coding to recover packet loss, the unrecoverable packet loss percentage at the application layer is not the same as the loss for the transport layer. Hence, an interaction between application layer estimation and transport layer estimation is necessary. Link layer FEC and ARQ overhead estimation module 460 is used to capture the overhead of channel FEC coding and retransmission at the link layer. The overhead of ARQ is considered in some wireless fair scheduling schemes but not in other schemes.

A second preferred feature of the system is that the allocation of the channel resources are preferably based on the specified value of the data flow (preferably, the specified weight $w_i$ and utility function $U_i(r_i)$). The utility curve based weights generation module 420 preferably takes the output of the overhead estimation modules 440, 450, 460 as its input, and based on the set of <$w_i$, $U_i(r_i)$, and overhead ratio>parameters for all the flows on the shared channel, generates the link-layer weights that are used to determine slot allocation for the flows under the fair scheduling technique. The goal of this module 420 is to generate the link-layer weights for slot allocation such that the aggregate weighted utility of the system is maximized.

A third preferred feature of the system is that the fair scheduling module 430 takes the link-layer weights for the flows and allocates to each flow an appropriate portion of the of the shared channel's resources. In general, these resources are time slots for transmission, such as interleaved time slots on wireless link 121. The resources can alternatively be measured as other units of the channels resources, such as the frequency bands in an FDMA link or the spreading codes in a CDMA link. The simplest technique for allocating time slots is a weighted round robin scheduler that allocates the channel in accordance with the flow weights, without any consideration for perceived location-dependent channel error. More sophisticated techniques, such as Wireless Packet Scheduling (WPS), may be used in order to account for bursty and location-dependent channel error. In one preferred embodiment of the system, standard wireless fair scheduling techniques are used without modification.

With this overview, we turn to more in-depth discussion of the system and its methods of operation. In particular, the following discussion will focus on: (a) the generation of overall weights (mentioned above as $w_i U_i(r_i)$) based on the weighted utility of the goodput rate, and (b) the estimation in each layer of added overhead, which encumbers the goodput and leads to the final throughput rates (denoted below by $F_i(r_i)$).

3. Utility Function and Weight Specification Module

The utility function and weight specification module 410 specifies the application-level goodput fairness model. It provides the network operator or the user application the flexibility to specify the utility curve according to their needs.

Consider a data flow that can be given a goodput data rate denoted by the variable r. That is, the data rate r indicates the number of bits per second of payload that are transmitted for a certain application. As an indicator of goodput, r does not include the transmission of overhead bits that accompany the application's payload.

A utility function U(r) can be specified to indicate the value or worth of the data flow as a function of the flow's goodput rates r. The function U(r) generally increases as a function or r, indicating that a data flow is more valuable to the system and its users if the data flow is transmitted at a high data rate than if it is transmitted at a low data rate. The function U(r) quantitatively expresses this worth.

Economic considerations suggest that U(r) is expected to be a concave function, meaning that its slope decreases as a function of r. In general, the utility function U(r) can be modeled as continuous, differentiable, increasing, and strictly concave over the range $r \geq 0$. The derivative of U(r) indicates the marginal utility of the data flow. The marginal utility can be recognized in economic terms as an important quantity for identifying optimal conditions for a system. The marginal utility $U'(r)=dU/dr$ indicates the incremental utility gained from an incremental increase in goodput rate. If U(r) is concave, then the marginal utility for rate is decreasing (i.e. $d^2U/dr^2$ is negative), and the utility function implicitly provides a notion of fairness across flows, assuming that all flows are elastic in nature.

The concaveness of U(r) is due to the decreasing marginal value of high goodput rates. In other words, it illustrates the fact that a fixed increase in transmission rate is typically more valuable to a flow when the data rate is slow than when the data rate is high. For example, an increase in data rate by 50 kb/s can be beneficial, but the value of the benefit depends on the current data rate for the flow: an increase from 10 kb/s to 60 kb/s is generally more significant to a user application than is an increase in that flow from 1000 kb/s to 1050 kb/s. Thus—assuming that all other things are equal—a 50 kb/s increase is more valuable if it is given to a data flow operating at 10 kb/s than if it is given to a data flow that is already operating at 1000 kb/s. The techniques discussed below illustrate some of the possible ways that U(r) can be used to distribute fairly a finite channel capacity among a set of parallel data flows.

In addition to a utility function, each flow can also be assigned a weight factor $w_i$, so that the overall utility of a flow is given by the quantity $w_i U_i(r_i)$ for flow number i. If all flows have the same weight $w_i$ and the same utility function $U_i(r_i)$, then the aggregate overall utility $\Sigma_i w_i U_i(r_i)$ is maximized when for all i and j, $r_i = r_j$. That is, the aggregate utility function is maximized when the application sending rate is the same for every flow. In this simple case, it is easy to see that maximizing the sum of concave utility functions achieves fairness.

It has been formally shown that there is a general equivalence between maximizing concave utility functions and achieving some system-wide notion of fairness. Specifically, any type of concave utility function can achieve a corresponding fairness model. Thus, any fairness objective in application level can be modeled by the following approach:

Maximize $\Sigma_i w_i U_i(r_i)$ subject to $\Sigma_i F_i(r_i) \leq C$, where $r_i$ is the application layer goodput rate and $w_i$ is the flow weight. The quantity C is the channel capacity. The function $F_i(r_i)$ is an "overhead function" that indicates the actual sending rate (throughput rate) at the link layer, including the overheads from all the layers. As discussed above, the throughput rate $F_i(r_i)$ is larger than the goodput rate r because in addition to the payload bits that make up the goodput, the throughput includes error-correction bits, retransmission bits, and other overhead bits for the data flow.

This optimization problem is solved at the point where each flow has the same weighted marginal utility, for all i,j, $w_i U'_i(r_i) = w_j U'_j(r_j) = K$ where K is some constant. So the optimum rate $r_i$ is:

for all i, $r_i = (U'_i)^{-1}(K/w_i)$. (1)

This expression indicates the optimum value of the flow rate $r_i$ on flow number i. Using the set of flow rates given by equation (1) for each of the flows leads to an optimal usage of the channel resources. It maximizes the total overall utility of all the flows' goodputs.

Note that the choice of the utility function $U_i$ for the data flows determines the fairness model for the system. For example, consider the utility function $U_i(r_i) = \log(r_i)$. If we normalize flow rates such that $\Sigma_i F_i(r_i) = 1$, then the optimized goodput rates are given by $r_i = (U'_i)^{-1}(K/w_i) = w_i/K$, (2)

and the constraint condition in terms of the throughput rates $F_i(r_i)$ becomes $\Sigma_i F_i(r_i) = \Sigma_i F_i(w_i/K) = 1$. (3)

Given the overhead functions $F_i(\ )$ for all the flows, we can plug in the appropriate values and obtain the corresponding values for K and hence the set of $r_i$ values. It has been shown that setting the utility function to $\log(r_i)$ achieves a type of fairness called "proportional fairness." Thus, in a system where all flows are constrained to have the same utility function of $\log(r_i)$, the scheduler will generate weights such that the system will converge to proportional fairness in the application-layer goodput rates.

Likewise, consider the case where the utility functions have the form $U(r) = -1/r$. This choice of utility functions will result in the effective rates set according to the following equation:

$\Sigma_i F_i(r_i) = \Sigma_i F_i((w_i/K)^{1/2}) = 1$. (4)

It has been shown that the system will converge to "minimum potential delay fairness" for this chosen utility function.

4. Overhead Estimation Modules

The above approach provides the set of $r_i$, the optimized application-layer goodput sending rates. Note that to solve the above system of equations to find the actual link-layer weights requires a knowledge of the overhead function $F_i(r_i)$, which indicate the actual throughput rates as a function of goodput rates. The following discussion describes the preferred operation of the overhead calculating modules 440, 450, and 460, which provide information on the throughput rate $F_i(r_i)$ that is needed to achieve a given goodput rate $r_i$.

In essence, knowledge of the throughput rate is needed because the link-layer's scheduler performs the final slot allocation for the entire throughput, including the overhead. While the goodput sending rates are optimized as a function of the utility curves and weights only, the throughput rate is the quantity that actually gets controlled by the scheduler for fair queuing. The overhead functions $F_i(\ )$ tell us the relationship between throughput rates $F_i(r_i)$ and goodput rates $r_i$.

As shown in FIG. 1, overhead estimation modules include the three separate but interacting estimation modules 440, 450, and 460, which operates on different layers to determine the overhead functions $F_i(\ )$. The following discussion focuses on how each layer can introduce overhead, and how the layers interacts with each other to create the added overhead.

4.1 Application Layer Overhead Estimation

It is well known that all bits in a data stream are not equal. Some bits belong to segments defining vital information such as control messages, synchronization messages, or the main frame of a Group of Block (GOB). Some bits belong to lower priority segments that are data messages, or dependent frames of a GOB. Further, wireless communications systems protect against wireless channel corruption loss and provide experiences similar to the wireline counterpart by adding some enhanced form of error correction. These additional mechanisms for removing the errors and restoring the original information are often deployed by the application layer. They include techniques such as (a) interleaving, (b) forward error correction (FEC), and (c) automatic repeat request (ARQ). These three application-layer techniques, and others, contribute to a data flow's overhead. Each technique creates overhead in a different way.

Interleaving is a mechanism to reorganize and redistribute the information to un-adjacent frames to deal with bursty wireless channel error. In contrast, FEC is commonly suggested for real-time applications due to the strict delay requirements. However, FEC incurs constant transmission overhead even when the channel is loss-free. Considering the limited bandwidth of most wireless links, it is important that the error control mechanism be spectrally efficient. To this end, a number of adaptive and hierarchical FEC coding schemes have been proposed. They all share the common point that the packets are divided into multiple priorities or classes and different levels of FEC protection are used to protect packets of different classes. For example, MPEG2 video can be classified into four classes including control class, I class, P class and B class. Because P-frames and B-frames depend on the adjacent I-frames to decode, the I-frame should be protected with a higher amount of redundancy than P-frames. At the same time, FEC could also be coded in a layered/hierarchical manner and could be transmitted when the corresponding data layer information is transmitted. Common FEC coding schemes include Reed-Solomon and Rate-compatible Punctured Convolutional.

When channel error rate is high and bandwidth is limited, some applications can choose to transmit only the basic layer and use strong FEC protection. When channel error rate is low and bandwidth is large, the application can choose to transmit multiple layers and use adaptive FEC protection.

Accordingly, the application-layer overhead estimation module 440 of data transmission system uses an overhead ratio $\alpha_{appl}$ to model the application layer FEC and ARQ overhead and a loss ratio $\beta_{appl}$ to model the overhead of the application layer loss. Given the application-layer goodput rate $r_i$, the resulting application-layer overhead function can be seen as:

$$F_{appl}(r_i)=r_i*(1+\alpha_{appl,i})/(1-\beta_{appl,i}) \quad (5)$$

Notice that above equation only considers the effect of the application layer. The integration with lower layers will be discussed in the following section after transport-layer and link-layer schemes are introduced independently.

4.2 Transport Layer Rate Adaptation Estimation

Transport layer protocols can be generally divided into two categories. One category is non-elastic protocols, i.e., UDP, which does not adjust transmission rate upon packet loss. The other category is elastic protocols, which adjust the transmission rate upon packet loss. In this category we focus on the TCP because TCP traffic is the main traffic of the Internet and many other protocols use the TCP-friendly congestion control schemes to control the transmission rate. From the angle of congestion control and rate adaptation techniques, these protocols have a similar analysis to TCP.

When UDP and other non-elastic protocol are used, the overhead of the transport layer is easily calculated. Assume $\beta_{tran}$ is the packet loss rate seen at the transport layer. The transport layer overhead function is then:

$$F_{tran,i}(r_i)=r_i/(1-\beta_{tran,i}) \quad (6)$$

On the other hand, when TCP and other TCP-friendly elastic protocols are used, the average transmission rate T can be modeled as:

$$T=s/(RTT*(2\beta_{tran}/3)^{1/2}), \quad (7)$$

where s is the packet size and RTT is the round trip time.

The main issue of rate adaptation is that when the packet loss ratio is high, the transport layer transmission rate T could be so small that the transport layer is the bottleneck between application layer and the link layer. In this case, although the link layer provides the flow with enough bandwidth, the flow cannot get service because the sender queue may be empty due to the bottleneck at the transport layer.

Notice that the link layer cannot compensate this kind of bandwidth waste. The wireless fair scheduling schemes only track the backlogged flows (flows with packets in the queue) and give credits to the flow if the flow's transmission either fails or gets postponed by the channel error. Because the flows with transport-layer bottleneck have an empty queue and receive no credit at the link layer, their fair share cannot be claimed back later when packets at the transport layer pour in. So the net result is that the flows with transport-layer backlogs receive an unfairly low share of the service.

One way to compensate such overhead is as follows. Transport-layer rate adaptation estimation module 450 preferably uses this approach to model the overhead generated in the transport layer. First, the average transport layer transmission rate T is calculated using measured average packet loss rate $\beta_{tran}$ and equation (7). Then the average expected application-layer transmission rate R (application-layer goodput together with application layer overhead) is obtained from the application layer. If $T \geq R$, no compensation is needed because the transport layer is not the bottleneck. Otherwise, if $T<R$, the link layer weight w has to be adjusted accordingly. Assume $r_{tran}$ is the rate adjustment ratio (R/T) and utility function is U(r). According to equation (1), the new weight $w_{new}$ is given by:

$$K/w_{new}=U'_i((U'_i)^{-1}(K/w_{old})*(R/T)). \quad (8)$$

Hence, if the utility function U(r) is log(r), $$w_{new}=r_{tran}*w_{old}=(R/T)w_{old}. \quad (9)$$

Similarly, if the utility function U(r) is (-1/r), $$w_{new}=(r_{tran})^2 w_{old}=(R/T)^2 w_{old}. \quad (10)$$

4.3 Link Layer FEC and ARQ Overhead Estimation

Similar to the application layer, link layers also typically use channel coding FEC and ARQ to combat the channel corruption. Because the link layers usually obtain the channel condition much quicker than upper layers, more advanced FEC and ARQ schemes tend to be used. Adaptive FEC coding schemes are proposed to adjust protection ability under the current channel state and to decrease where possible unnecessary FEC overhead. Compared with application-layer FEC, the adjustment frequency of link-layer FEC is much faster. ARQ is more suitable in the link layer than in the application layer, since application-layer retransmission is end-to-end. ARQ in the link layer is local and is commonly used in wireless LAN scenarios, because it has a smaller delay between consecutive tries. Because both FEC and ARQ have overhead and wireless channel error tends to be bursty, the channel packet loss cannot be completely recovered by the link-layer mechanisms without an undue amount of added overhead. Some of the wireless fair queuing schemes take into account the overhead of ARQ of corrupted packets while some schemes do not. Preferably taking these factors into account, link layer FEC and/or ARQ overhead estimation module 460 uses the quantity $\beta_{link}$ to denote the packet loss ratio of the link layer, and the quantity alink to denote the FEC overhead of the link layer and the residue ARQ that is not considered by fair queuing schemes.

4.4 Interaction Among Different Layers

Having discussed the overhead of each layer separately, we summarize the overall overhead of the system by studying the interaction of the layers. Application-layer overhead estimation module 440 determines $\alpha_{appl}$ to model the application layer FEC and ARQ overhead, and $\beta_{appl}$ to model the overhead of the application layer loss ratio. Transport-layer rate adaptation estimation module 450 determines the quantity $\beta_{tran}$ to model packet loss rate for non-elastic protocols, and the quantity $r_{tran}$ to model the influence of rate adaptation of elastic protocols. Link layer FEC and/or ARQ overhead estimation module 460 determines the quantity $\alpha_{link}$ to model link layer FEC and residue ARQ overhead and the quantity $\beta_{link}$ to denote the link layer packet loss. Also notice that each layer's adjustment interval could be different. Assume $t_{appl}$, $t_{tran}$, and $t_{link}$ are the adjustment intervals of application layer, transport layer and link layer, respectively. It is reasonable to assume that $t_{appl} \geq t_{tran} \geq t_{link}$.

In terms of the goodput rate r, the total overhead of FEC and ARQ of the system is then calculated to be:

$$F_{fec\text{-}arq}(r)=r*(1+\alpha_{appl})*(1+\alpha_{tran})*(1+\alpha_{link})$$

$$\approx r*(1+\alpha_{appl}+\alpha_{tran}+\alpha_{link})=r*(1+\alpha). \quad (11)$$

Here, the quantity a is the system FEC and ARQ overhead ratio, and is given by $\alpha=(\alpha_{appl}+\alpha_{tran}+\alpha_{link})$. At different adjustment intervals, $\alpha$ is changed accordingly by assuming other layer's FEC and ARQ ratios do not change at that time.

Note that the packet loss at the lower layers may or may not be recovered by the upper layers' reliable transmission schemes, such as ARQ schemes. The total system-wide packet loss rate is therefore not simply the sum of loss rates of each layer. On the contrary, considering different adjustment intervals, the system wide packet loss ratio $\beta$ is seen as:

$$\beta=\min\{\beta_{appl}, \beta_{tran}, \beta_{link}\}.$$

For a flow with multiple sub-flows, the loss rate for the flow at each layer is the sum of loss rate of each sub-flow at each layer. Then the system wide packet loss ratio $\beta$ is seen by choosing the minimum among the loss ratios at each layer.

$$\beta_{appl}=\Sigma_i \beta_{appl,i}, \beta_{tran}=\Sigma_i \beta_{tran,i}, \text{ and } \beta_{link}=\Sigma_i \beta_{link,i}.$$

$$\beta=\min\{\beta_{appl}, \beta_{tran}, \beta_{link}\}.$$

The system-wide loss function is then:

$$F_{loss}(r)=r/(1-\beta). \tag{12}$$

Combining equations (11) and (12), the overhead introduced by FEC, ARQ, and packet loss is $$F(r)=r*(1+\alpha)/(1-\beta). \tag{13}$$

Finally, consider the overhead of transport layer rate adaptation and assume $r_{tran}$ is the rate adjustment ratio (R/T). When the average transport layer transmission rate T is smaller than the average expected application-layer transmission rate R, the total overhead is $$F(r)=r*r_{tran}*(1+\alpha)/(1-\beta). \tag{14}$$

Hence, when $T \geq R$, equation (13) is the overhead function and when $T \leq R$, equation (14) is the overhead function. For clarity, we use $\mu$ to denote the overhead ratios in both cases. So $$F(r)=r*\mu. \tag{15}$$

The overhead ratio $\mu$ has a value of $\mu=(1+\alpha)/(1-\beta)$ when $T \geq R$, and a value of $\mu=r_{tran}(1+\alpha)/(1-\beta)$ when $T \leq R$.

The overhead function is then made available to (or is calculated by) utility-curve based weights generation module 420.

5. Utility Curved Based Weights Generation Module

After each flow's overhead function $F_i(r_i)=r_i*\mu_i$ is estimated and input to the utility-curved based weights generation module 420, this module 420 calculates appropriate weights for each flow and outputs the results to the weighted wireless fair queuing module 430 to schedule the flows. Repeated below is equation (1), which indicates that for a general utility function $U_i(\ )$, the optimized goodput rates are given by:

$$\text{for all } i, r_i=(U'_i)^{-1}(K/w_i) \tag{1}$$

Equation (1) gives the optimal goodput rate $r_i$ for each flow, and then $F_i(r_i)=r_i*\mu_i$ gives the optimal link layer throughput that can be used for scheduling channel slots among the data flows.

In the case where the utility function is $U_i(r_i)=\log(r_i)$ and the fairness model is proportional fairness, equation (2) indicated that $$r_i=(U'_i)^{-1}(K/w_i)=w_i/K \tag{2}$$

and equation (15) indicates that the constraint condition from equation (3) becomes $$\Sigma_i F_i(r_i)=\Sigma_i \mu_i \times (w_i/K)=1. \tag{16}$$

so that $K=\Sigma_i \mu_i w_i$ and the overhead functions are $F_i(r_i)=\mu_i w_i/\Sigma_i \mu_i w_i$.

Likewise, in cases where the utility function is set to $U_i(r_i)=-1/r_i$ and the fairness model is minimum potential delay fairness, the constraint condition becomes:

$$\Sigma_i F_i(r_i)=\Sigma_i \mu_i((w_i/K)^{1/2})=1. \tag{17}$$

so $K=(\Sigma_i \mu_i(w_i^{1/2}))^2$ and the overhead functions are $F_i(r_i)=\mu_i(w_i^{1/2})/(\Sigma_i \mu_i(w_i^{1/2}))$.

6. Weighted Wireless Fair Queuing Module

In this section, we briefly describe Wireless Packet Scheduling (WPS), a wireless fair scheduling technique that approximates the fluid queuing model. It modifies the basic weighted round robin (WRR) scheduling technique in order to accommodate location-dependent and bursty wireless channel errors. The following are some of the possible features of the WPS technique.

- Spreading: generates a time slot allocation identical to weighted fair queuing (WFQ) or worst-case fair weighted fair queuing ($WF^2Q$) when all flows are backlogged.
- Swapping within frame: when a flow cannot transmit in its slot because of channel error, it tries to swaps its slot with another backlogged flow that (a) has been allocated a slot later in the same frame, and (b) perceives a good channel at the current time; intra-frame swapping is a first level mechanism to accommodate location-dependent errors.
- Credit adjustment: when a flow f1 cannot transmit during its slot and cannot swap slots within a frame, but there is at least one backlogged flow f2 that can transmit at the current time (f2 does not have any slots during the remainder of the frame), f1's credit is incremented and f2's credit is decremented (both within bounds); the effective weight of each flow at the start of a frame is the aggregate of its default weight and its credit, and the spreading technique generates a slot allocation with respect to the effective weights of the flows. Thus, credit adjustment compensates lagging flows at the expense of leading flows in future frames.
  - The credit adjustment procedure preferably uses interaction between weighted fair queuing module 430 and link layer FEC and/or ARQ overhead estimation module 460. Module 460 identifies backlogs in the link layer, and provides this information to module 460. Where possible, module 460 preferably adjusts the credits of the flows so that the backlogged flows can be compensated later.
- One-step prediction: predicts that the channel state for the current time slot will be the same as the monitored channel state during the previous time slot.

7. Embodiment of a Method for Transmitting Multiple Data Flows

Figure 5:
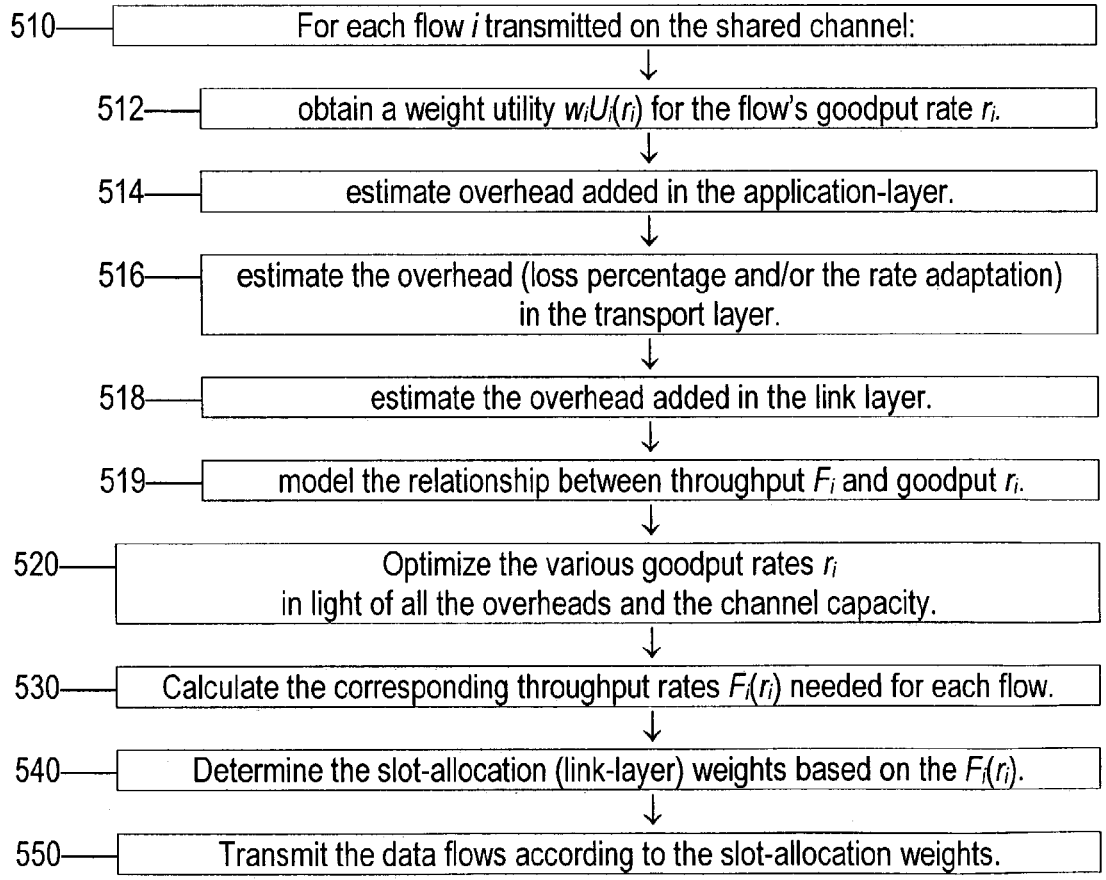
FIG. 5 is an overview flowchart of one embodiment of a method for transmitting multiple flows of data on a single shared channel.

FIG. 5 is an overview flowchart of one embodiment of a method for transmitting multiple flows of data on a single shared channel. The data flows being transmitted in this embodiment each connect one application (either a user application or a system application) at one end of the channel to another application at the other end of the channel. The data flows can be considered "parallel" data flows in the sense that they share the same channel, even if the channel uses time-division multiplexing to transmit the flows in time slots, sending one flow at a time.

The total number of parallel data flows depends on the number of applications that are trying to communicate over the shared channel. Let the symbol N indicate the total number of parallel flows. The flows are indicated by index numbers i, such as i=1, i=2, i=3, . . . , up to i=N.

The flowchart starts with block 510, which indicates that the immediately following blocks 512, 514, 516, 518, and 519 are repeated for each of the N data flows being transmitted. That is, these blocks are repeated for the 1st, 2nd, . . . N-th flow. In other words, these blocks are repeated for the "i-th" flow, where the indexing variable i is initialized at i=1 and is incremented over the range from 1 to N.

In block 512, the method determines a weighted utility for the goodput of the i-th flow. The weighted utility of flow number i is preferably given by two quantities: a number $w_i$ (the assigned weight for the i-th flow), and a function $U_i(r_i)$ (indicating the utility of the i-th flow as a function of $r_i$, the goodput of the i-th flow). These utility functions can be assigned by the method, or they can be received from an over-layer of system tools that indicate how much priority is to be given to each flow. Two of the many forms of utility functions are $U(r)=\log(r)$ and $U(r)=-(r)^{-1}$.

Block 514 estimates the various forms of overhead that arise in the application layer of the transmitting system. A primary source of application-layer overhead is the redundancy and other overhead from error-protection tools, such as interleaving, FEC, or ARQ. The estimation can be preformed by looking up the overhead characteristics in a data table, by receiving the overhead information from another source, or preferably, by making repeated empirical measurements of the overhead as a function of time.

Similarly, block 516 estimates the overhead added in the transport layer, including overhead from error-protection tools. Block 516 also preferably evaluates the loss rate in the transport layer, including packet loss rates, required retransmission rates, and average transmission rates.

Block 518 estimates the overhead added in the link layer, and block 519 uses the information from blocks 512, 514, 516, and 518 to generate a composite model of the overhead for data flow number i. This composite model can be symbolized by the function $F_i(r_i)$, which indicates the throughput rate $F_i$ that is needed to achieve a desired goodput rate $r_i$ on data flow number i.

Block 520 then uses the flow weights $w_i$, the utility functions $U_i(r_i)$, and the overhead functions $F_i(r_i)$ from all of the N parallel data flows to find the optimal goodput rates for each data flow. Since a single communications channel can only communicate a limited amount of information at a time, this optimization takes into account the limits of the shared channel resource. Block 520 does its optimization in light of the channel capacity C of the shared channel.

Using the optimized goodput rates $r_i$ from block 520, block 530 determines the optimized throughput rates $F_i$ that should be transmitted on the shared channel for each data flow. The appropriate slot-layer or "link-layer" weights for these throughputs are calculated in block 540. This block involves the calculation of the appropriate number of time slots, or the appropriate length of time slots, that should be allocated to each of the data flows in view of the targeted throughput rates. Alternatively, for FDMA or CDMA channels, block 540 calculates the appropriate allocation of frequency slots and or spreading codes for each data flow. The flows are transmitted on the shared channel using these allocated slots in block 550.

Figure 6:
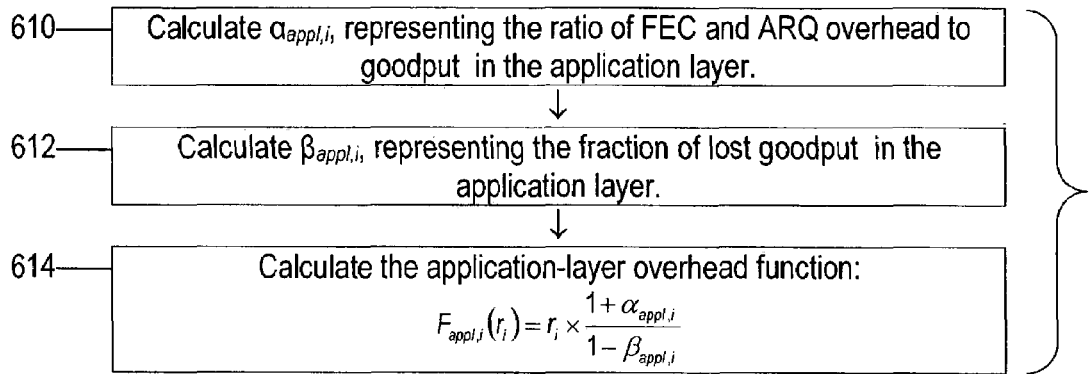
FIG. 6 is a flowchart of one preferred implementation of a procedure for estimating overhead added by an application layer to a data flow.

FIG. 6 is a flowchart of one preferred implementation of block 514 of FIG. 5, which estimates the overhead added by the application layer to data flow number i. This flowchart starts with block 610, in which a ratio $\alpha_{appl,i}$ of overhead to goodput in the application layer is calculated for flow number i. This ratio preferably accounts for FEC and ARQ overhead. In block 612, a fraction $\beta_{appl,i}$ of lost goodput from the application layer is calculated for flow number i. These parameters are provided to block 519 in FIG. 5 so that the overall overhead function can be calculated. Optionally or instead, if needed, an intermediate calculation of the application-layer overhead function can be made in block 614 according to the formula:

$$F_{appl,i}(r_i) = r_i \times \frac{1+\alpha_{appl,i}}{1-\beta_{appl,i}}.$$

Figure 7:
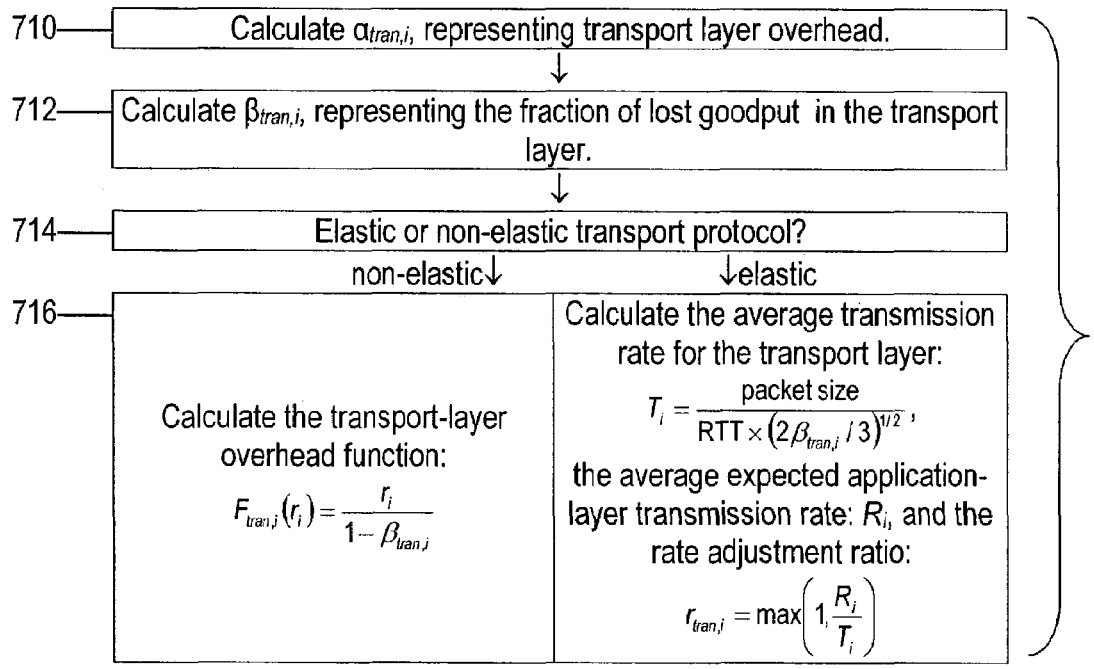
FIG. 7 is a flowchart of one preferred implementation of a procedure for estimating overhead added by a transport layer to a data flow.

FIG. 7 is a flowchart of one preferred implementation of block 516 from FIG. 5, which estimates the overhead added by the transport layer to data flow number i. This flowchart starts with block 710, in which a ratio $\alpha_{tran,i}$ of overhead to goodput in the transport layer is calculated for flow number i. This ratio preferably accounts for error-protection overhead. In block 712, a fraction $\beta_{tran,i}$ of lost goodput from the transport layer is calculated for flow number i. These parameters are provided to block 519 in FIG. 5 so that the overall overhead function can be calculated. Optionally or instead, if needed, an intermediate calculation of the transport-layer overhead function can be made in blocks 714 and 716. Block 714 determines whether an elastic or non-elastic transport protocol is being used for data flow number i. If a non-elastic protocol is in use, then block 716 calculates the transport layer overhead function according to the formula:

$$F_{tran,i}(r_i) = \frac{r_i}{1-\beta_{tran,i}}.$$

Alternatively, if decision block 714 determines that an elastic transport protocol is used for data flow number i, then block 716 calculates the rate adjustment ratio according to the formula:

$$r_{tran,i} = \max\left(1, \frac{R_i}{T_i}\right),$$

where $R_i$ is the application-layer transmission rate, and where $T_i$ is the average transmission rate, estimated by:

$$T_i = \frac{\text{packet size}}{RTT \times (2\beta_{tran,i}/3)^{1/2}}.$$

Figure 8:
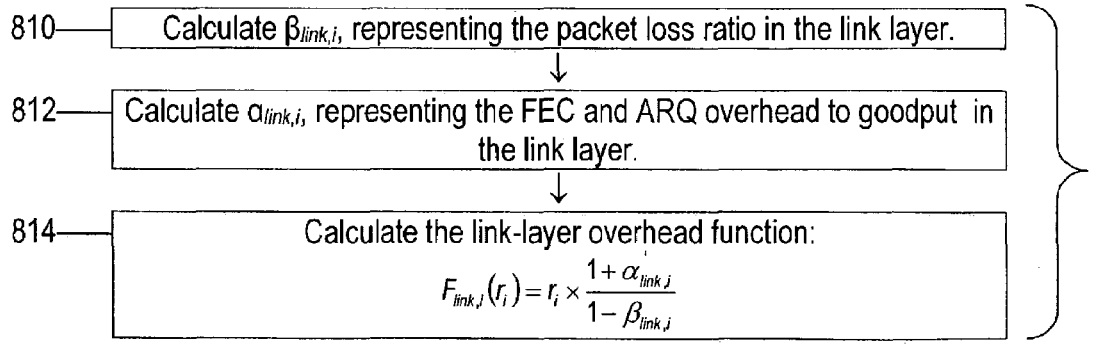
FIG. 8 is a flowchart of one preferred implementation of a procedure for estimating overhead added by a link layer to a data flow.

FIG. 8 is a flowchart of one preferred implementation of block 518 from FIG. 5, which estimates the overhead added by the link layer to data flow number i. This flowchart starts with block 810, in which a fraction $\beta_{link,i}$ of lost goodput from the link layer is calculated for flow number i. In block 812 a ratio $\alpha_{link,i}$ of overhead to goodput in the link layer is calculated for flow number i. This ratio preferably accounts for FEC and ARQ overhead. These parameters are provided to block 519 in FIG. 5 so that the overall overhead function can be calculated. Optionally or instead, if needed, an intermediate calculation of the link-layer overhead function can be made in block 814 according to the formula:

$$F_{link,i}(r_i) = r_i \times \frac{1+\alpha_{link,i}}{1-\beta_{link,i}}.$$

FIG. 9 is a flowchart of one preferred implementation of block 519 of FIG. 5, which models the relationship between throughput and goodput for data flow number i. This flowchart starts with block 910, in which an overall system overhead ratio $\alpha_i$ is calculated according to $\alpha_i=(1+\alpha_{appl,i})(1+\alpha_{tran,i})(1+\alpha_{link,i})$. In block 912, an overall fraction of lost goodput $\beta_i$ for the system is calculated according to $\beta_i=\min\{\beta_{appl,i}, \beta_{tran,i}, \beta_{link,i}\}$. Using these quantities, block 914 determines the overall overhead ratio $\mu_i$ for the several layers according to the formula:

$$\mu_i = r_{tran,i} \times \frac{1+\alpha_i}{1-\beta_i},$$

where $r_{tran,i}$ is described above in the discussion of block 716.

FIG. 10 is a flowchart of one preferred implementation of block 520 of FIG. 5, which finds the optimal goodput transmission rates. This flowchart starts with block 1010, which maximizes the quantity K—the weighted marginal utility common to all flows. This maximization is done by finding the largest values of K that satisfies the channel-capacity constraint:

$$\Sigma_i F_i((U'_i)^{-1}(K/w_i)) \leq C$$

Once the maximized value of K has been calculated, block 1020 generates the optimized goodput rate for each flow number i among the N data flows. The optimized goodput rate $r_i$ is:

$$r_i = (U'_i)^{-1}(K/w_i)$$

With this set of optimized goodput rates, block 530 from FIG. 5 can calculate the optimized throughput rates that should be allocated to the various data flows.

8. Adaptation to Various Implementations

By carefully evaluating the overhead of each layer, the mechanisms described above can be used to dynamically adjust the weights of the link layer weighted fair queuing schemes to guarantee the application layer goodput rate and the optimization of overall system-wide goodput.

The techniques related in the above discussions and equations can be suitable for different utility functions and fairness models. The utility function gives applications or system operators the flexibility to express the relative importance of the data and/or the price the application is willing to pay for the service.

Note that goodput better captures the requirements of the applications than the previous techniques using throughput. Goodput only considers useful application layer data packets that are directly related to the application performance. Compared with link layer throughput, goodput is a better index than throughput from the user's point of view.

A variety of reasons for overhead have been categorized and treated accordingly in the above examples, such as FEC, ARQ, packet loss, and rate adaptation. The parameters and methods described above can be used to capture the overhead. In addition, persons having skill in the art will appreciate that other sources of overhead can be similarly quantified and treated, using similar tools.

In addition to the sources of overhead, the discussion has considered interaction between different layers' overhead. By examining the overhead from each layer, duplicative solutions have been removed. Thus, the techniques disclosed can be adapted to work either separately in each layer or collectively in the system. Different adjustment intervals and adjustment capability of each layer can also be treated by these techniques, if needed. Each layer can work separately without other layers or collectively when other layers' overhead exists.

Both non-elastic and elastic transport protocols are amenable to these techniques. Not only FEC, ARQ and packet loss for non-elastic protocols, but also the overhead of rate adaptation in elastic protocols can be addressed.

Thus, it is to be understood that multiple variations, changes, and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

The invention claimed is:

1. A method of communicating a plurality of data flows on a shared communications channel, the method comprising:
calculating a set of optimum goodput rates for the data flows, wherein the optimum goodput rates maximize a total utility of the data flows;
calculating a set of optimum throughput rates for the data flows in response to the optimum goodput rates, based on an estimation of a relationship between throughput rates and goodput rates for each of the data flows, taking into account, for each data flow, overhead factors at two or more layers selected from an application layer, a transport layer and a link layer; and
transmitting the data flows on the shared communications channel with the optimized throughput rates.

2. The method of claim 1, further comprising:
obtaining utility functions for goodput rates for each of the data flows;
wherein said calculating the set of optimum goodput rates is performed in response to the utility functions for goodput rates.

3. The method of claim 1, further comprising:
obtaining weighting factors for each of the data flows;
wherein said calculating the set of optimum goodput rates is performed in response to the weighting factors.

4. The method of claim 1, wherein said estimating the relationship between throughput rates and goodput rates is performed in response to real-time operating conditions.

5. The method of claim 1, wherein said estimating the relationship between throughput rates and goodput rates further includes:
monitoring a transport layer of a first data flow among the data flows; and
wherein said calculating the set of optimum throughput rates further includes: if the transport layer of the first data flow is bottlnecked, temporarily assigning a low throughput rate to the first data flow.

6. The method of claim 1, wherein said estimating the relationship between throughput rates and goodput rates further includes:

monitoring a transport layer of a first data flow among the data flows; and wherein said calculating the set of optimum throughput rates further includes: if the transport layer of the first data flow is bottlenecked, temporarily blocking the first data flow and later assigning a high compensatory throughput rate to the first data flow.

7. The method of claim 1, wherein said estimating the relationship between throughput rates and goodput rates comprises:

estimating an application-layer overhead factor $\alpha_{appl,1}$ for an application layer of a first data flow among the data flows;

estimating a transport-layer overhead factor $\alpha_{tran,1}$ for a transport layer of the first data flow;

estimating a link-layer overhead factor $\alpha_{link,1}$ for a link layer of the first data flow;

estimating an overall overhead factor $\alpha_1$ by summing the application-layer overhead factor, the transport-layer overhead factor, and the link-layer overhead factor, so that $\alpha_1 = \alpha_{appl,1} + \alpha_{tran,1} + \alpha_{link,1}$; and using the overall overhead factor $\alpha_1$ to estimate the relationship between throughput rates and goodput rates for the first data flow.

8. The method of claim 1, wherein said estimating the relationship between throughput rates and goodput rates comprises:

estimating a first overhead factor $\alpha_{A,1}$ for a first layer of a first data flow among the data flows;

estimating a second overhead factor $\alpha_{B,1}$ for a second layer of the first data flow;

estimating an overall overhead factor $\alpha_1$ by summing the first and second overhead factors so that $\alpha_1 = \alpha_{A,1} + \alpha_{B,1}$; and using the overall overhead factor $\alpha_1$ to estimate the relationship between throughput rates and goodput rates for the first data flow.

9. The method of claim 1, wherein said estimating the relationship between throughput rates and goodput rates comprises:

estimating an application-layer loss factor $\beta_{appl,1}$ for an application layer of a first data flow among the data flows;

estimating a transport-layer loss factor $\beta_{tran,1}$ for a transport layer of the first data flow;

estimating a link-layer loss factor $\beta_{link,1}$ for a link layer of the first data flow;

estimating an overall loss factor $\beta_1$ by selecting a minimum among the application-layer loss factor, the transport-layer loss factor, and the link-layer loss factor so that $\beta_1 = \min\{\beta_{appl,1}, \beta_{tran,1}, \beta_{link,1}\}$; and using the overall loss factor $\beta_1$ to estimate the relationship between throughput rates and goodput rates for the first data flow.

10. The method of claim 1, wherein said estimating the relationship between throughput rates and goodput rates comprises:

estimating a first overhead factor $\beta_{appl,1}$ at the application layer for a first sub-flow of a first data flow among the data flows;

estimating a second overhead factor $\beta_{appl,2}$ at the application layer for a second sub-flow of the first data flow;

estimating an overall overhead factor $\beta_{appl}$ at the application layer by summing the first and second overhead factors so that $\beta_{appl} = \beta_{appl,1} + \beta_{appl,2}$; and using the overall overhead factor $\beta_{appl}$ to estimate the relationship between throughput rates and goodput rates for the first data flow at the application layer.

11. The method of claim 1, wherein said estimating the relationship between throughput rates and goodput rates comprises:

estimating a first overhead factor $\beta_{tran,1}$ at the transport layer for a first sub-flow of a first data flow among the data flows;

estimating a second overhead factor $\beta tran,2$ at the transport layer for a second subflow of the first data flow;

estimating an overall overhead factor $\beta_{tran}$ at the transport layer by summing the first and second overhead factors so that $\beta_{tran} = \beta_{tran,1} + \beta_{tran,2}$; and using the overall overhead factor $\beta_{tran}$ to estimate the relationship between throughput rates and goodput rates for the first data flow at the transport layer.

12. The method of claim 1, wherein said estimating the relationship between throughput rates and goodput rates comprises:

estimating a first overhead factor $\beta link,1$ at the link layer for a first sub-flow of a first data flow among the data flows;

estimating a second overhead factor $\beta_{link,2}$ at the link layer for a second sub-flow of the first data flow;

estimating, an overall overhead factor $\beta_{link}$ at the link layer by summing the first and second overhead factors so that $\beta_{link} = \beta_{link,1} + \beta_{link,2}$; and using the overall overhead factor $\beta_{link}$ to estimate the relationship between throughput rates and goodput rates for the first data flow at the link layer.

13. The method of claim 1, wherein a first data flow among the data flows has a plurality of sub-flows, and wherein said estimating the relationship between throughput rates and goodput rates comprises:

estimating a first loss factor $\beta appl$ at the application layer for the first data flow by summing together estimated application-overhead factors for two or more sub-flows among the plurality of sub-flows;

estimating a second loss factor $\beta tran$ at the transport layer for the first data flow by summing together estimated transport-overhead factors for two or more sub-flows among the plurality of sub-flows;

estimating a third loss factor $\beta_{link}$ at the link layer for the first data flow by summing together estimated link-overhead factors for two or more sub-flows among the plurality of sub-flows;

estimating an overall loss factor $\beta_1$ by selecting a minimum among the application-layer loss factor, the transport-layer loss factor, and the link-layer loss factor so that $\beta_1 = \min\{\beta_{appl}, \beta_{tran}, \beta_{link}\}$; and using the overall loss factor $\beta_1$ to estimate the relationship between throughput rates and goodput rates for the first data flow.

14. The method of claim 1, wherein said calculating the set of optimum goodput rates includes:

selecting a marginal utility common to the data flows, wherein the selected marginal utility yields a total throughput rate for the data flows that is maximized and less than or equal to a channel capacity of the shared communications channel, and determining the set of optimum goodput rates in response to the selected marginal utility.

15. The method of claim 1, further comprising:

for each data flow,
(a) obtaining a utility function and a corresponding weighting factor, the utility function being a function of the goodput rate of the data flow; and
(b) estimating a relationship between the throughput of the data flow and the goodput rate.

16. The method of claim 15, wherein said calculating the set of optimum goodput rates includes:

selecting a marginal utility common to the data flows, wherein said selecting the marginal utility maximizes a total throughput rate, while ensuring that the total throughput rate is less than or equal to a channel capacity of the shared communications channel, and determining one or more of the optimum goodput rates in response to the selected marginal utility and the weighting factors.

17. The method of claim 1, wherein the shared communications channel is an Ethernet connection.

18. The method of claim 1, wherein the shared communications channel is a wireless IEEE 802.11 connection.

19. A digital communications unit for transmitting a plurality of data flows on a shared communications channel, the digital communications unit comprising:

a processing unit;

a memory coupled to the processing unit;

a channel interface adapted to connect with the shared communications channel, coupled to the processing unit, coupled to the memory, configured to operate under the control of the processing unit, and configured to transmit a plurality of data streams from the memory through the shared communications channel;

a weights generation module coupled to the processing unit and configured to calculate optimal goodput rates for the plurality of data streams;

a high-layer overhead estimation module counled to the weights generation module;

a rate adaptation estimation module coupled to the weights generation module;

a low-layer overhead estimation module coupled to the weights generation module;

a fair queuing module coupled to the channel interface and to the weights generation module, and configured to allocate channel capacity on the shared communications channel to the plurality of data streams in response to the optimal goodput rates calculated by the weights generation module;

wherein the weights generation module is configured (a) to calculate relationships between throughput and goodput in response to overhead information and loss rate information received from the high-layer overhead estimation module, from the rate adaptation estimation module, and from the low-layer overhead estimation module, and (b) to calculate the optimal goodput rates in response to the relationships between throughout and goodput.

20. The digital communications unit of claim 19, wherein the weights generation module and the fair queuing module are implemented in semiconductor logic units.

21. The digital communications unit of claim 19, wherein the weights generation module and the fair queuing module are implemented as software stored in the memory and adapted to be executed by the processing unit.

22. The digital communications unit of claim 19, wherein the low-layer overhead estimation module is further coupled to the fair queuing module; wherein the fair queuing module is configured to block one or more of the data flows in response to bottleneck information received from the low-layer overhead estimation module.

23. The digital communications unit of claim 19, wherein the high-layer overhead estimation module is an application-layer overhead estimation module.

24. The digital communications unit of claim 19, wherein the rate adaptation estimation module is a transport-layer rate adaptation estimation module.

25. The digital-communications unit of claim 19, wherein the low-layer overhead estimation module is a link-layer FEC and ARQ overhead estimation module.

26. The digital communications unit of claim 19, wherein the shared communications channel is an Ethernet connection.

27. The digital communications unit of claim 19, wherein the shared communications channel is a wireless IEEE 802.11 connection.

* * * * *